No. 848,036. PATENTED MAR. 26, 1907.
A. KRÜGER.
JOINER'S CLAMP.
APPLICATION FILED JUNE 17, 1905.
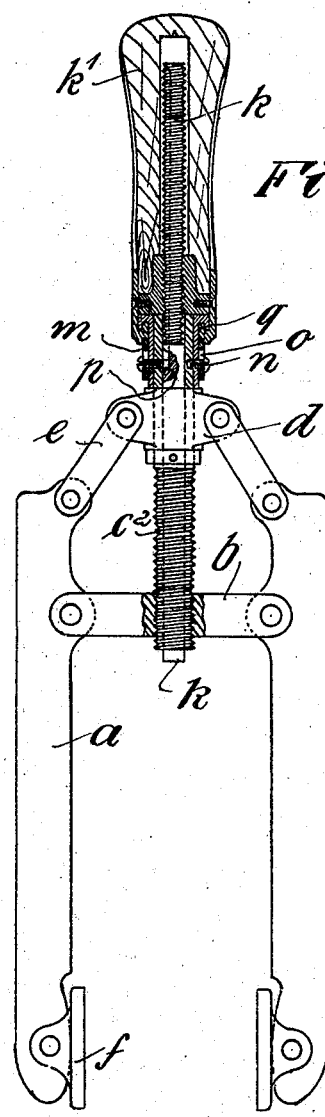
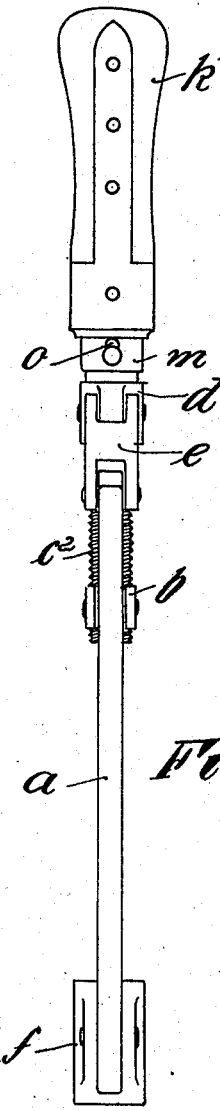
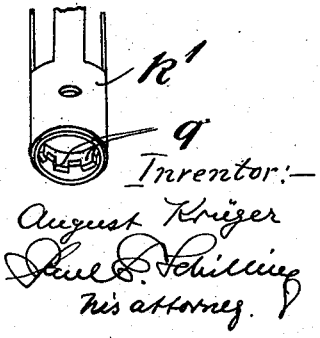
Witnesses:—
Paul Arres
Gustav Hezel
Inventor:—
August Krüger
by Paul D. Schilling
his attorney.

UNITED STATES PATENT OFFICE.

AUGUST KRÜGER, OF KÖSLIN, GERMANY.

JOINER'S CLAMP.

No. 848,036.   Specification of Letters Patent.   Patented March 26, 1907.

Application filed June 17, 1905. Serial No. 265,650.

*To all whom it may concern:*

Be it known that I, AUGUST KRÜGER, a subject of the German Emperor, and residing at Köslin, Germany, have invented certain new and useful Improvements in Joiners' Clamps, of which the following is a specification.

My invention relates to an improved clamp especially adapted for compressing the freshly-glued joints in the construction of framework, furniture, and the like.

The principle on which this tool is constructed is that of having three points of pressure moving in conjunction with one another, the pressure exerted at two of the points acting in the direction toward or away from each other, while at the third point the pressure is exerted perpendicularly to the first said direction. The tool is thus adapted for the most varied classes of work requiring gluing. It can be applied, for example, when it is necessary to attach fillets to the ends of boards or to join two boards together or to secure two fillets with a miter-joint. In addition to its use in joinery the clamp will also prove serviceable for smiths' and fitters' work.

My invention is illustrated in the accompanying drawing, in which—

Figure 1 is an elevation, partly in section. Fig. 2 is an edge view, and Figs. 3 and 4 are detail views.

In the drawing, $k'$ designates the handle, which is provided with an interiorly-threaded socket, within which is threaded the upper end of the spindle $k$. An exteriorly-threaded sleeve $c^2$ is arranged on the spindle $k$, through which the spindle projects. Upon the sleeve $c^2$ is mounted the head $d$, connected by links $e$ to the upper ends of the limbs $a$, carrying jaw-faces $f$. A link $b$ is pivoted at its outer ends to the jaws or limbs and centrally is threaded to receive the lower end of the sleeve $c^2$. Above the collar $d$, loosely encircling the sleeve $c^2$, is a ring $m$, provided on its upper edge with teeth $q'$ for engagement with similar teeth $q$ on the handle $k'$. (See Figs. 3 and 4.) This ring is provided with vertical slots $o$, through which pass screws $n$, one of which is screwed into the sleeve $c^2$ and the other passes through the sleeve and extends into and travels in a longitudinal slot $p$ in the spindle $k$. When it is desired to operate the spindle $k$ only, the ring $m$ is uncoupled from the handle $k$ and the latter rotated, whereby the threads cause vertical movement of the spindle. When it is desired to operate the spindle $k$ and sleeve $c^2$ in unison, the ring $m$ is pushed upwardly to engage its teeth with those of the handle. In this latter position upon rotation of the handle motion is imparted to both the spindle and sleeve through the ring $m$ and screws $n$, causing the spindle and sleeve to move vertically and the jaws to open or close, owing to their threaded connection with the sleeve. The link $b$ of the clamps instead of being straight, as shown, may obviously be curved in any desirable manner. The pressing-jaws may be removably secured to the limbs $a$, so that single or double faced ones may be employed, as desired. A further advantage of my new clamp is that it admits of an outward pressure being exerted. For this reason the position of double-faced jaws is advantageous.

What I claim, and desire to secure by Letters Patent, is—

1. A joiner's clamp comprising a collar smoothly bored, a pair of jaws or limbs, a pair of links pivotally connecting one end of each jaw to an opposite end of said collar, a single link connecting the jaws intermediate their ends, a handle, a hollow screw-spindle carried by the handle swiveled in the collar and threaded through the single connecting-link, a solid spindle within the hollow spindle and projecting beyond the end thereof, and means whereby the hollow spindle and solid spindle may be simultaneously actuated, or only the hollow spindle actuated, substantially as described.

2. A joiner's clamp comprising a collar smoothly bored, a pair of jaws or limbs a pair of links pivotally connecting one end of each jaw to an opposite end of said collar, a single link connecting the jaws intermediate their ends, a handle having a sleeve with teeth formed in its lower edge, a hollow screw-spindle carried by the handle swiveled in the collar and threaded through the single connecting-link, a solid spindle within the hollow spindle and projecting beyond the end thereof, a sleeve connected to the solid spindle and having teeth in its upper edge, and means for engaging or disengaging these teeth with those of the handle-sleeve, substantially as described.

In testimony that I claim the foregoing as my invention I have signed my name in presence of two subscribing witnesses.

AUGUST KRÜGER.

Witnesses:
FERDINAND WITTE,
IDA BAUMGART.